United States Patent
Kamps

[19]

[11] Patent Number: 6,131,786
[45] Date of Patent: Oct. 17, 2000

[54] DEVICE FOR SETTING RIVETS, BUTTONS OR THE LIKE ON TEXTILES

[75] Inventor: Rolf Kamps, Wuppertal, Germany

[73] Assignee: YKK Corporation, Tokyo, Japan

[21] Appl. No.: 09/142,241

[22] PCT Filed: Jan. 9, 1998

[86] PCT No.: PCT/EP98/00105

§ 371 Date: Sep. 3, 1998

§ 102(e) Date: Sep. 3, 1998

[87] PCT Pub. No.: WO98/30832

PCT Pub. Date: Jul. 16, 1998

[30] Foreign Application Priority Data

Jan. 9, 1997 [DE] Germany .......................... 197 00 524

[51] Int. Cl.$^7$ .................................................. B21J 15/28
[52] U.S. Cl. ................................... 227/2; 227/8; 227/15; 227/30
[58] Field of Search .................................. 227/1, 2, 4, 7, 227/8, 15, 18, 30; 192/134; 200/61.42

[56] References Cited

U.S. PATENT DOCUMENTS

| | | | |
|---|---|---|---|
| 1,466,170 | 8/1923 | Hunker | 192/134 |
| 1,500,960 | 7/1924 | Regan | 192/134 |
| 2,642,973 | 6/1953 | Chmelar | 192/134 |
| 4,343,423 | 8/1982 | Sauermilch | 227/1 |
| 4,374,309 | 2/1983 | Walton | 192/134 |
| 4,378,900 | 4/1983 | Sauermilch | 227/8 |
| 4,420,071 | 12/1983 | Seki | 200/61.42 |
| 4,541,558 | 9/1985 | Herten et al. | 227/1 |
| 4,586,248 | 5/1986 | Ho | 192/134 |
| 4,598,468 | 7/1986 | Yoshieda | 227/7 |
| 4,703,882 | 11/1987 | Herten | 227/8 |
| 4,724,990 | 2/1988 | Yoshieda et al. | 227/8 |
| 4,741,466 | 5/1988 | Birkhofer | 227/4 |
| 5,014,895 | 5/1991 | Ito | 227/8 |
| 5,048,741 | 9/1991 | Toishi et al. | 227/18 |
| 5,501,001 | 3/1996 | Kamps | 227/15 |
| 5,908,148 | 6/1999 | Kochs et al. | 227/30 |

FOREIGN PATENT DOCUMENTS 949919 9/1956 Germany .

*Primary Examiner*—Peter Vo
*Assistant Examiner*—Jim Calve
*Attorney, Agent, or Firm*—Friedrich Kueffner

[57] ABSTRACT

The device is used for fixing rivets, buttons, etc., which comprises an article lower part and an article upper part, to a fabric. It has a lower gripper (1) supporting the article lower part and a plunger (2) performing the riveting stroke. With the lower end of the plunger is associated an upper gripper (3) acting on the article upper part and with the upper end is associated a drive mechanism (4) responsible for the stroke movement. A finger guard bow (11), associated with the plunger and extending into the movement path of the upper gripper and which, after initiating a plunger riveting stroke, on encountering an obstacle and before reaching its end position, stops the drive mechanism and consequently the plunger. A significant constructional simplification of the device is obtained in that the finger guard bow (11) is connected to the plunger (2) acting on the gripper (3) in the sense of an entrainment, on initiating the stroke movement by the drive mechanism (4), by a coupling element (13), which initiates the stopping of the drive mechanism when the ginger guard bow (11) strikes the obstacle (14). The coupling element (13) is formed by a two-jointed bar (15) with an inserted spring (16). An electric switch (19) is located in the circuit (20) controlling the drive mechanism (4) of the plunger (2) and responds to a length change of the two-jointed bar (15) through the finger guard bow (11) striking the obstacle (14) accompanied by the tensioning of the spring (16).

7 Claims, 4 Drawing Sheets

DEVICE FOR SETTING RIVETS, BUTTONS OR THE LIKE ON TEXTILES

BACKGROUND OF THE INVENTION

1. Field of the Invention

The invention relates to a device for fixing rivets, buttons, etc., which comprises an article lower part and an article upper part, to a fabric or the like, with a lower gripper supporting the article lower part and a plunger, which performs the riveting stroke and with whose lower end is associated an upper gripper acting on the article upper part and with whose upper end is associated a drive mechanism ensuring the stroke movement, and with a finger guard bow, associated with the plunger and extending into the movement path of the upper gripper and which, following the release of a plunger riveting stroke, on encountering an obstacle stops the drive mechanism and therefor the plunger before reaching its end position.

2. Description of the Related Art

Fixing machines for clothing and leather accessories, as well as fasteners, which are formed by riveting machines, are subject to safety regulations, governing the shaft use by the final consumer. Virtually all the safety measures taken are disadvantageous from the handling standpoint, for the rapid removal of faults and for inspection of the working area. Therefore particular importance is attached to the safety devices. These lead to not inconsiderable costs compared with the overall machine costs. Apart form the electrical safety regulations which apply, it is necessary to respect regulations for the danger zone in the working area of the machine, where the upper gripper is moved towards the lower gripper. In this area the most serious injuries to hands and fingers can occur if adequate safety measures are not taken. According to existing guidelines access to this area must be secured in such a way that the safety spacing, i.e. the remaining opening width during the working stroke movement is equal to or smaller than 4 mm.

Manufacturers have developed different systems in order to satisfy this requirements. As the working area for loading and unloading must be as large as possible, it is necessary to secure and/or control the danger zone between the upper and lower grippers prior to the working stroke. For this purpose it is known to bind the upper gripper to the plunger in such a way that it opens a contact as soon as an obstacle occurs in the danger zone. The drive is immediately subject to braking by means of the brake of the brake motor drive and the working stroke is interrupted. As a massive gripper is used for scanning the danger zone, painful contacts with the fingers and fingernails in the danger zone give rise to blue spots, although the permitted power of 50 N for the safety system is not exceeded.

A pneumatic system is also known, in which the drive is switched in pressure less manner as soon as the plunger strikes an obstacle during its downward movement.

Finally a device of the aforementioned type is known with the aid of which hand and finger injuries can be effectively avoided in that besides the main drive mechanism for the plunger drive there is an additional drive mechanism for driving the leading finger guard bow. Only when the latter has traversed the danger zone within a predetermined time up to the lower and point, is the main drive mechanism started and the plunger performs the working stroke. Admittedly this system operates safely, but requires considerable control expenditure and an additional drive mechanism. Moreover, disadvantageously, the machining period is slowed down by the lead time of the finger guard bow.

SUMMARY OF THE INVENTION

The problem of the invention is to so further develop the known device that, despite constructional simplification and reduction of the matching period, an effective finger protection is ensured.

According to the invention this problem is solved in that the finger guard bow is connected by means of a coupling element with the plunger acting on the upper gripper in the sense of an entrainment on the release of the stroke movement by the drive mechanism and the coupling element initiates the stopping of the drive mechanism when the finger guard bow strikes an obstacle.

Thus, the invention is based on the finding that use can be made of the main plunger drive for driving the finger guard bow, i.e. there is no need for an additional drive mechanism, provided that it is ensured that the finger guard bow drive is derived from the plunger movement and namely in leading manner with respect to the latter. Due to the fact that the finger guard bow is driven by means of the plunger the system requires no lead time and component costs are low.

It has proved to be particularly advantageous if the coupling element is formed by a two-jointed bar with an inserted spring and if with the two-jointed bar is associated an electric switch, which is in the circuit controlling the plunger drive mechanism and responds to a length change of the two-jointed bar as a result of the finger guard bow striking an obstacle and therefore a length change accompanied by the tensioning of the spring.

Appropriately the drive mechanism incorporates a crank gear with a connecting rod, whose free end acts on the plunger by means of a lever arrangement used for power transmission purposes. This lever arrangement advantageously has a two-armed toggle lever pivotably mounted about a spindle extending substantially transversely to the plunger movement path and whose first arm is coupled to the free end of the connecting rod and whose second arm is in drive connection with the plunger. A particularly simple construction is obtained if the second arm of the toggle lever is coupled to the plunger by means of a guide rod acting in pivotable manner on the latter.

For the control of the finger guard bow, it would be possible to associate with the plunger a transversely projecting guide member connected to one end of the two-jointed bar. For a gentle control of the finger guard bow, it has proved more favourable to use a construction in which with the plunger is associated a cam element pivotable as a function of the plunger movement in a plane extending parallel to its axis and to which is articulated the two-jointed bar leading to the finger guard bow.

A particularly simple solution is obtained if the cam element has a starting cam portion, which is subject to the action of the plunger during its first stroke portion by means of a roll, pulley, etc. and extends in inclined manner to the plunger axis in such a way that during plunger movement there is a pivoting of the cam element and an end cam portion forming an obtuse angle $\alpha$ with the starting cam portion and which extends with respect to the pivot pin of the cam element and the roll in such a way that when the plunger passes through said end cam portion it substantially brings about no further pivoting movement of the cam element and consequently the finger guard bow.

BRIEF DESCRIPTION OF THE DRAWING

Further details, advantages and features can be gathered form the following description and with reference to the attached diagrammatic drawings, wherein show.

DESCRIPTION OF THE PREFERRED EMBODIMENTS

Figure 1:
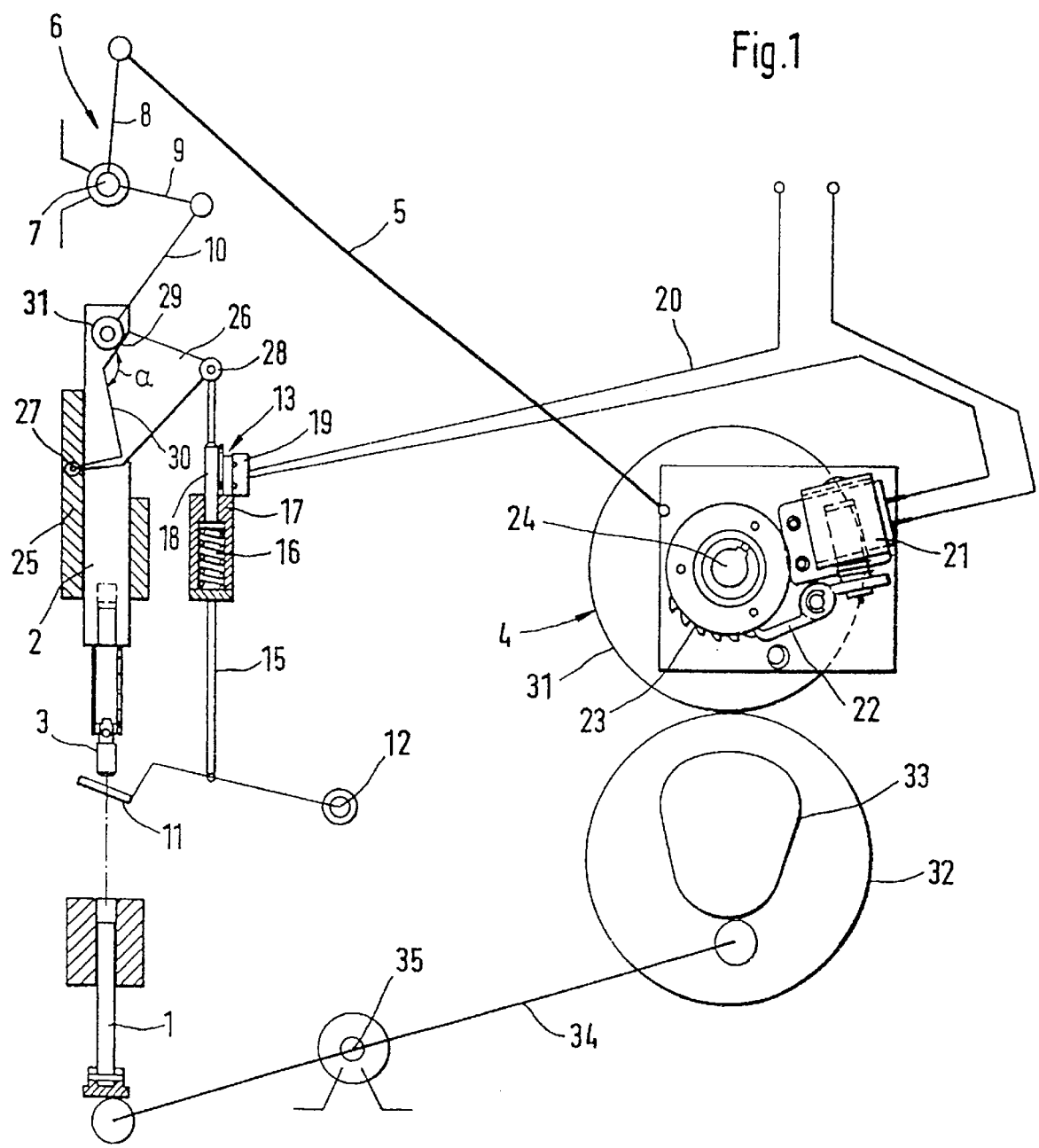
FIG. 1 The device in the starting position.

As can be gathered form the drawings, the device for fixing rivets, buttons, etc., which in per se known, not shown manner comprises an article lower part and an article upper part, to a fabric or the like comprises a lower gripper 1 supporting the article lower part and a plunger 2 performing the actual riveting stroke. With the lower end of the plunger 2 is associated an upper gripper 3 acting on the article upper part. On the upper end of the plunger 2 acts a drive mechanism 4 responsible for the stroke movement and namely by means of a connecting rod 5, whose free end is articulated to a lever arrangement 6 having a power transmission function. The lever arrangement 6 comprises a two-armed toggle lever pivotably mounted in the vicinity of the plunger 2 about a spindle 7 extending substantially transversely to the movement path of the plunger 2 and whose first arm 8 is coupled to the free end of the connecting rod 5. The second arm 9 of the toggle lever is in drive connection with the plunger 2. For this purpose the free end of the second arm 9 of the toggle lever is coupled to the plunger 2 by means of a guide rod 10 pivotably acting on the latter.

Figure 4:
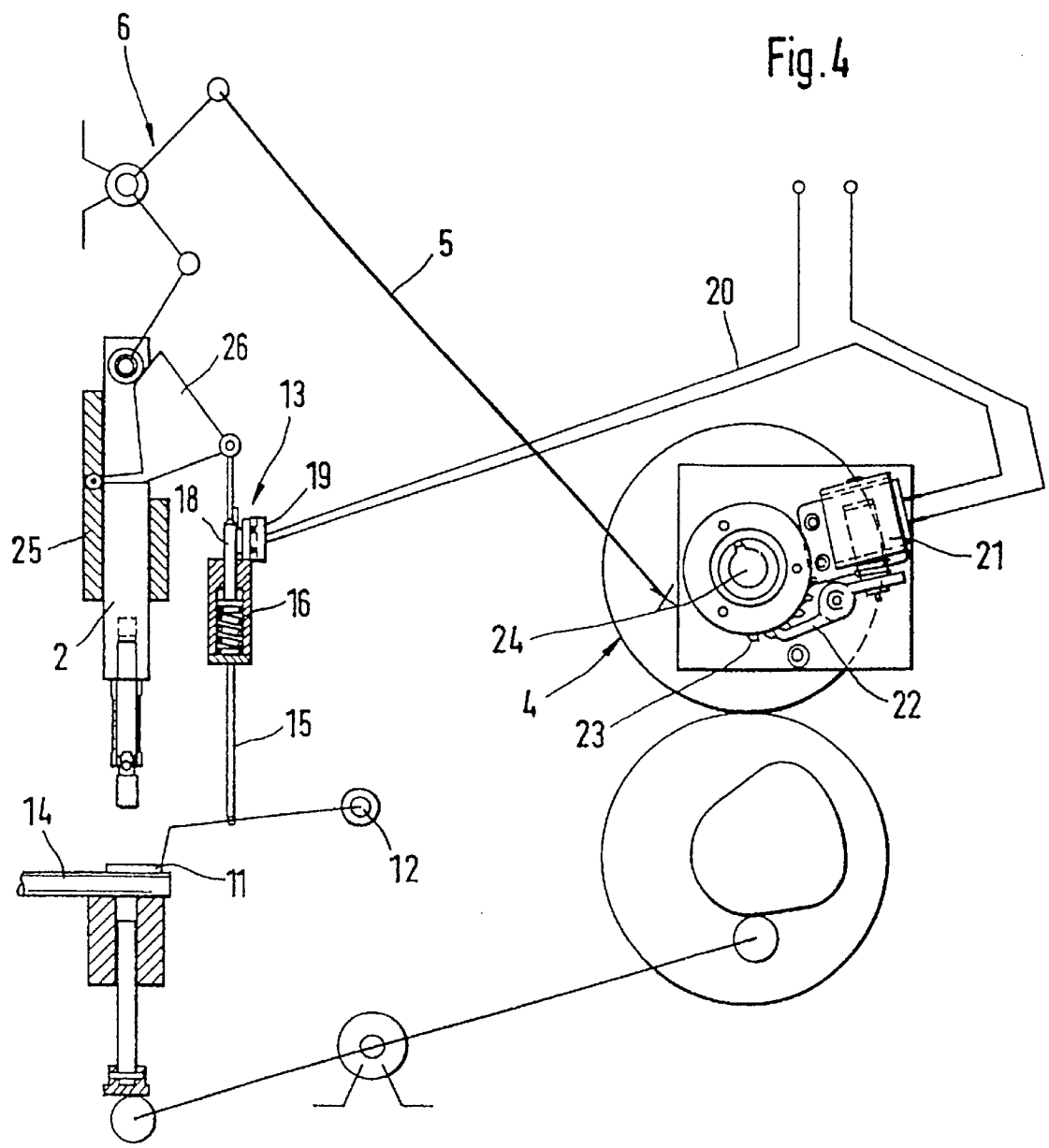
FIG. 4 The device on disconnection on encountering an obstacle.

The drawings show that with the plunger 2 is associated a finger guard bow 11, which is pivotably mounted about a spindle 12 extending substantially transversely to the movement path of the plunger 2. The finger guard bow 11 is connected to the plunger 2, acting on the upper gripper 3, in the sense of an entrainment on initiating the stroke movement through the drive mechanism 4 by means of a coupling element 13. This coupling element 13 initiates the stopping of the drive mechanism 4 when the finger guard bow strikes an obstacle 14, as illustrated in FIG. 4. It can be seen that the coupling element 13 is formed by a tow-jointed bar 15 with inserted spring 16. In the illustrated embodiment the spring is constructed as helical spring and mounted in a cylindrical casing 17. One end of the spring engages on a ram 18, which forms part of the tow-jointed bar 15 and whose other part is firmly connected to the casing 17 on the side of said casing remote from the ram 18. Above the casing 17 is located a diagrammatically indicated switch 19 controllable by the ram 18. The electric switch 19 is located in a circuit 20 controlling the drive mechanism 4 of the plunger 2. For this purpose the circuit 20 is guided by means of an electromagnet 21 for operating a pawl 22. The latter is couplable with a ring gear 23 connected with the crank gear for the connecting rod 5 and which is in operative connection with a concentrically arranged shaft 24 constantly driven by a motor, by means of a not shown loop or link spring of a per se known loop or link spring coupling brake system.

The drawings also show that a cam element 26 is associated with the plunger 2, which is vertically dispalceably mounted in the bore of a guide casing 25. This cam element 26 is pivotable in a plane extending parallel to the axis of the plunge 2 as a function of the plunger movement and namely about a pivot pin 27 provided in the guide casing 25. In an area of the cam element 26 remote from the pivot pin 27 is articulated at 28 one end of the two-jointed bar 15 connecting the cam element to the finger guard bow 11. The cam element 26 has a starting cam portion 29 and an end cam portion 30 forming with the starting cam portion 29 an obtuse angle α. On the plunger 2 is mounted in rotary manner a roll 31 controlling the pivoting movement of the cam element 26 during the plunger stroke. In the first stroke portion of the plunger 2 the roll acts on the starting cam portion 29 which, as shown in FIG. 1, is inclined to the plunger axis in such a way that during the plunger movement there is a clockwise pivoting of the cam element about the pivot pin 27. The stoke and therefore the pivoting movement is initiated by switching on the power supply to the electromagnet 21 by means of the circuit 20, in that the pawl 22 releases the tooth system of the ring gear 23, so that the latter, by means of the loop spring drives, from the shaft 24, the crank gear with the connecting rod 5 leading to the lever arrangement 6. As soon as, during the plunger movement, the roll 31 reaches the apex of the obtuse angle α between he starting cam portion 29 and the end cam portion 30, the cam element 26 is in a position in which the end cam portion 30 extends parallel to the axis of the plunger 2, i.e. with respect to the pivot pin 27 in such a way that the plunger 2, when the roll 31 passes thorough said end cam portion 30, brings about no further pivoting movement of the cam element 26 around the pivot pin 27 and also no pivoting movement of the finger guard bow 11.

If during the aforementioned pivoting movement of the cam element 26 entraining it, the finger guard bow 11 strikes an obstacle 14, as illustrated in FIG. 4, then this immediately leads to a length change of the spring 16 in the cylindrical casing 17, namely a shortening by compression of the spring 16 by the ram 18 and consequently an action of the electric switch 19 in the sense of the opening of its controlled circuit 20 of the electromagnet 21. The pawl 22 immediately drops in, blocks the ring gear, opens the coupling of the loop spring coupling brake system and therefore ensures an immediate stoppage of the drive mechanism of the plunger 2.

The drawings also show that the drive mechanism 4 is coupled by means of its crank gear disk 31 to a cam disk 32, which carries a driving cam 33 for acting on a pivoted lever 34. The latter is pivotably mounted about a pivot pin 35 and acts with its free end on the lower gripper 1, which supports the article lower part. In this way the lower grippers 1 is controllable by the drive mechanism 4 in the opposite directions to the plunge 2. On stopping the drive mechanism 4, i.e. when the finger guard bow 11 strikes an obstacle 14, the movement of the lower gripper 1 towards the upper gripper 3 at the lower end of the plunger 2 is immediately stopped.

Figure 2:
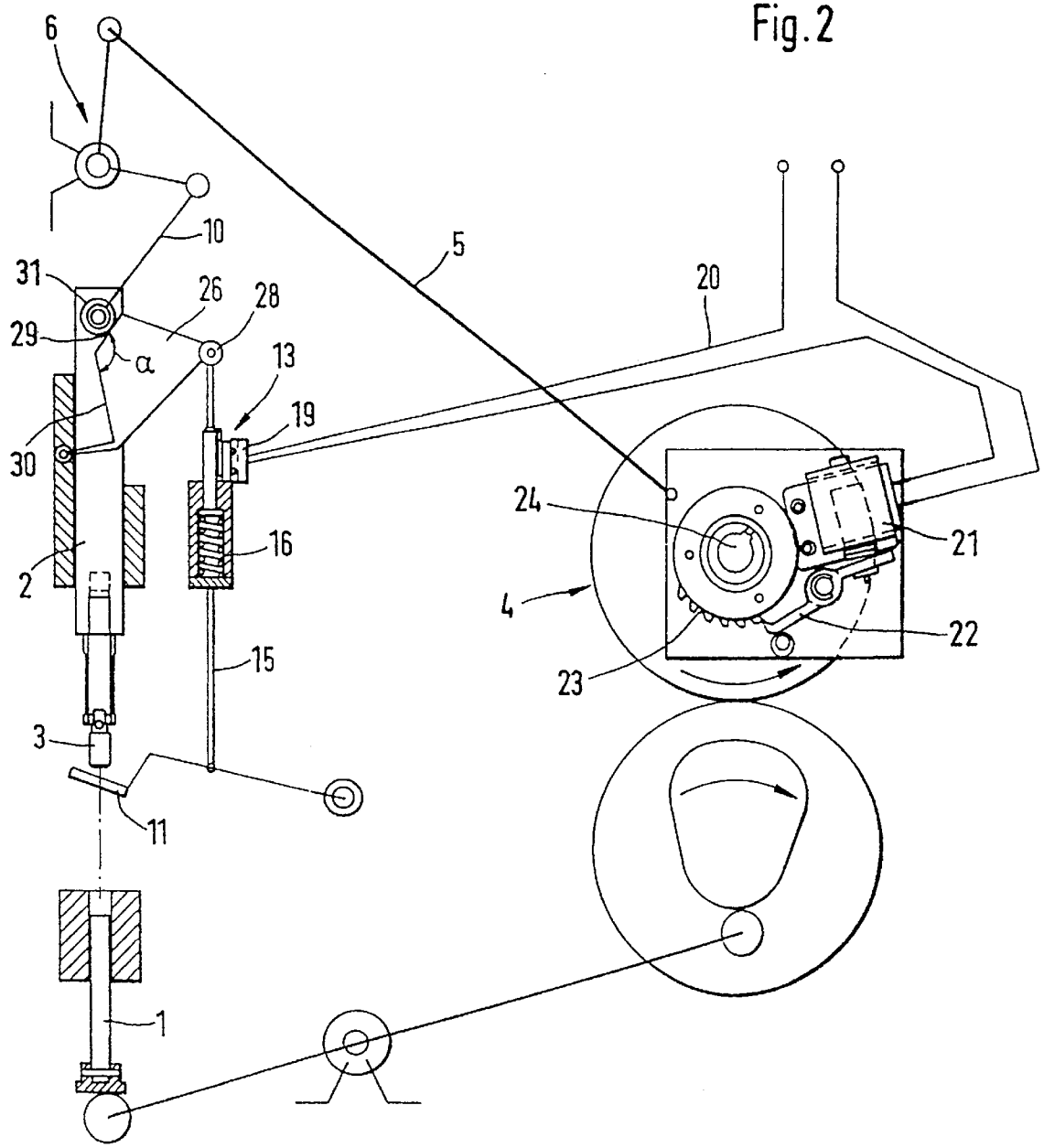
FIG. 2 The device at the time of initiating the start.
Figure 3:
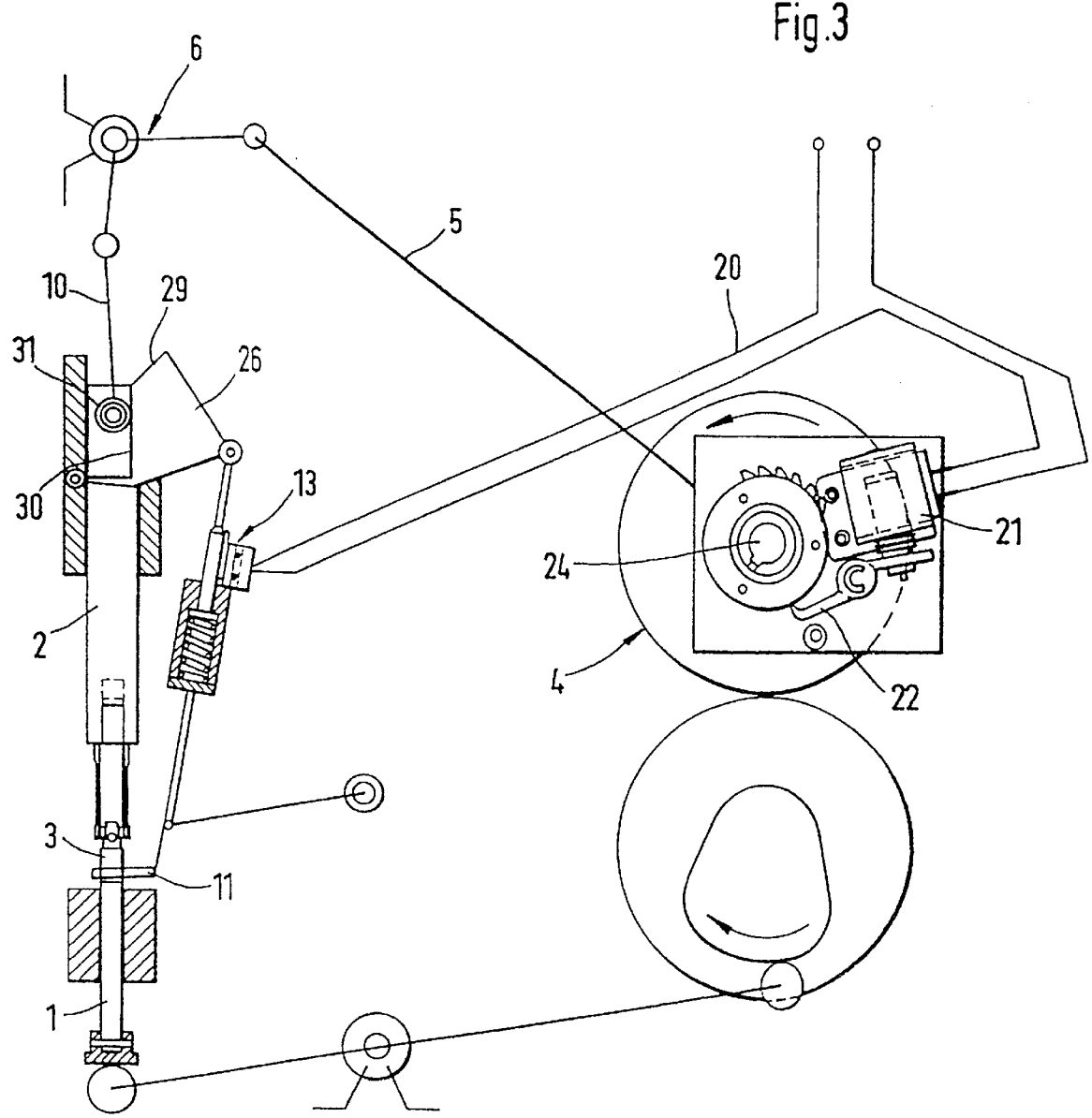
FIG. 3 The device during the riveting process.

The individual phases of the movement of the drive mechanism and the function of the finger guard bow are diagrammatically illustrated in FIGS. 1 to 4. Whereas FIG. 1 shows the complete inoperative position, i.e. the starting position of the component immediately prior to the release of a work cycle, FIG. 2 diagrammatically shows the start of a work cycle by energizing the electromagnetic 21 and consequently the release of the rotary movement of the crank gear for driving the connecting rod 5. Thus, the electromagnet 21 has transferred the pawl 22 into the release position, i.e. into the position in which the coupling barrier is opened and the rotary movement can commence. FIG. 3 shows the position of the individual components following a 180° rotation of the crank gear. The upper gripper 3 and lower gripper 1 are then in the riveting position. Following a further 180° rotation after the riveting process, all the components are once again in the starting position, i.e. that shown in FIG. 1.

FIG. 4 illustrates the position of the components following a 60° rotation of the crank gear when the finger guard bow 11 strikes an obstacle 14. As the electric switch 19 immediately opens the circuit of the electromagnet 21 responsible for coupling, the pawl drops in, opens the coupling and thus stops the further stroke movement of the plunger 2. If the fingers of the operator accidentally pass into the are of the movement path of the upper gripper, the leading finger guard bow 11 ensures the immediately stoppage of the device, so as to effectively prevent injury.

What is claimed is:

1. Device for fixing rivets, buttons, which comprises an article lower part and an article upper part, to a fabric or the like, the device comprising a lower gripper (1) supporting the article lower part and a plunger (2), which performs a riveting stroke and has a lower end having an upper gripper (3) acting on the article upper part and has an upper end, the device further comprising a drive mechanism (4) connected to the upper end for driving the plunger (2) to perform the riveting stroke along a movement path in a direction toward the lower gripper (1), and further comprising a finger guard bow (11), operatively connected to the plunger and extending into the movement path of the upper gripper, wherein the finger guard bow (11) is operatively connected by means of a coupling element (13) and a cam element (26) pivotally mounted on a guide casing (25) of the plunger with the plunger (2) such that, when the plunger (2) performs a riveting stroke, the plunger (2) moves the finger guard bow (11) via the coupling element (13) and the cam element (26) into a guard position, wherein the coupling element (13) is configured to stop the drive mechanism when the finger guard bow (11) strikes an obstacle (14).

2. Device according to claim 1, wherein the coupling element (13) comprises a two-jointed bar with a compressible spring (16) configured to allow a length change of the two-jointed bar (15, 16, 18) and an electric switch (19) operatively connected to the two-jointed bar (15, 16, 18), wherein the electric switch (19) is connected to a circuit controlling the drive mechanism (4) and responds to a length change of the two-jointed bar (15, 16, 18) resulting from a compression of the compressible spring caused by the finger guard bow (11) encountering the obstacle (14) by stopping the drive mechanism (4).

3. Device according to claim 2, wherein the cam element (26) is pivotable substantially in a plane extending parallel to a longitudinal axis of the plunger, and wherein the cam element (26) is pivoted by the plunger performing the riveting stroke, and wherein the two-jointed bar (15, 16, 18) is connected to the cam element (26) and transmits a pivoting movement of the cam element (26) onto the finger guard bow (11) for moving the finger guard bow (11) into the guard position.

4. Device according to claim 1, wherein the drive mechanism (4) comprises a crank gear with a connecting rod (5) and a lever arrangement (6), wherein the connecting rod (5) has a first end connected to the lever arrangement (6), wherein the connecting rod (5) acts via the lever arrangement on the plunger (2), the lever arrangement (6) having a power transmission function.

5. Device according to claim 4, wherein the lever arrangement (6) comprises a two-armed toggle lever (8, 9) pivotably mounted in the area of the plunger (2) about a spindle (7) extending substantially transversely to the movement path of the plunger (2), wherein a first arm (8) of the toggle lever (8, 9) is coupled to the first end of the connecting rod (5) and a second arm (9) of the toggle lever (8, 9) is in drive connection with the plunger (2).

6. Device according to claim 5, wherein the lever arrangement (6) comprises a guide rod (10) and wherein the second arm (9) of the toggle lever (8, 9) is pivotably connected to the guide rod (10) and the guide rod (10) is pivotably connected to the plunger.

7. Device according to claim 4, wherein the cam element (26) has a starting cam portion (29) and an end cam portion (30), wherein the plunger (2) has a roll (31) acting on the starting cam portion (29) during a first portion of the riveting stroke, wherein the starting cam portion (29) extends in inclined manner to the longitudinal axis in such a way that during the first portion of the riveting stroke of the plunger the cam element (26) is pivoted, wherein the end cam portion (30) forms an obtuse angle α with the starting cam portion in such a way that, after pivoting of the cam element (26) caused by the roll (31) acting on the starting cam portion (29), said end camp portion (30) extends parallel to the movement path of the plunger (2) so that the role (31) passes along said end cam portion (30) without causing further pivoting of the cam element (26) and consequently of the finger guard bow (11).

* * * * *